US 6,717,956 B1

(12) United States Patent
Fan et al.

(10) Patent No.: US 6,717,956 B1
(45) Date of Patent: Apr. 6, 2004

(54) DUAL-MODE VIRTUAL NETWORK ADDRESSING

(75) Inventors: Jason C. Fan, Mountain View, CA (US); Prasad P. Jogalekar, Sunnyvale, CA (US); Vinay K. Bannai, Mountain View, CA (US)

(73) Assignee: Luminous Networks, Inc., Cupertino, CA (US)

( * ) Notice: Subject to any disclaimer, the term of this patent is extended or adjusted under 35 U.S.C. 154(b) by 0 days.

(21) Appl. No.: 09/518,957

(22) Filed: Mar. 3, 2000

(51) Int. Cl.[7] .................................................. H04J 3/18
(52) U.S. Cl. ........................................ 370/477; 370/389
(58) Field of Search ................................ 370/477, 389, 370/475, 465, 392

(56) References Cited

U.S. PATENT DOCUMENTS

| 4,644,532 A | * | 2/1987 | George et al. ............... 370/255 |
| 6,115,394 A | * | 9/2000 | Balachandran et al. ...... 370/477 |
| 6,570,857 B1 | * | 5/2003 | Haartsen et al. ............ 370/312 |

OTHER PUBLICATIONS

MMC Networks, "EPIF 4–L3 Reference Manual," MMC 97–0030, Issue 1.0.
MMC Networks, "AnyFlow 5400 Product Overview".
MMC Networks, EPIF4–L3C1 Ethernet Port L3 Processor, MMC Networks, Inc., MMC 98–0066, Issue 1.0.
MMC Networks, XPIF–300A3/XPIF–300A3–50 Gigabit BitStream Processor, MMC 99–0046, Issue 0.91.

* cited by examiner

Primary Examiner—Chi Pham
Assistant Examiner—Keith M. George
(74) Attorney, Agent, or Firm—Sawyer Law Group LLP

(57) ABSTRACT

A dual addressing mode is described in which reduced-length addresses (referred to as short addresses) are substituted for standard addresses (referred to as long addresses) for traffic whose source or destination is internal to a given virtual network topology. The required length of short addresses used for a given virtual topology is dependent on the number of devices reachable within the topology. For a virtual topology with less than 256 addressable devices, for example, 8-bit short addresses can be used. When a node within the virtual network sees a packet with a short destination address in the header, the node understands the address to be within the virtual network and routes the packet accordingly. If a source address is a short address, the virtual network can identify the source within the virtual network. For packets originating in the virtual network whose destination is also in the virtual network, both the source and destination addresses can be short addresses. Thus, devices within a virtual network topology are addressable in a dual manner on the data link layer and/or network layer by traffic flowing internal to, or private to, the virtual network. Also described is a technique for automatically assigning source addresses to devices within the virtual network.

4 Claims, 13 Drawing Sheets

DUAL-MODE VIRTUAL NETWORK ADDRESSING

FIELD OF THE INVENTION

This invention relates to communication networks and, in particular, to an addressing scheme for a network to reduce overhead.

BACKGROUND

Data-carrying capacity in access and long-haul networks is a billable commodity to service providers. Traditional networks have employed a single static addressing mode for data link layer and network layer devices in these networks, such as 32-bit Internet Protocol (IP) addresses or 48-bit Media Access Control (MAC) addresses in Gigabit Ethernet. The motivation for long addresses is that every device across all networks worldwide can be assigned a unique data link layer and/or network layer address, which enables full portability of devices without address duplication conflicts and with a minimum of management overhead. However, these addresses compose a large portion of the packet header overhead (roughly 60% for Gigabit Ethernet and roughly 40% for IP) added to packets at the networking layer or at the data link layer. Any reduction in this overhead through compression of these addresses increases the data-carrying capacity of such networks.

In integrated voice and data networks, the average size of IP data packets is roughly 250 bytes, with over 50% of the packets being only 64 bytes. The average size of circuit-emulated voice packets is usually smaller than the average size of IP packets to minimize packetization delay (assume 150 bytes). The 12 bytes of MAC-layer addressing is a significant fraction (4% of data, 7% of voice) of the overall packet size, and thus any compression of this addressing will significantly improve the data-carrying capacity of deployed access and long-haul networks using an Ethernet-like MAC layer. This directly adds to the billable capacity of the service providers that own such networks.

Related to the invention described herein of dual-mode addressing is the identification of the network topology. Topology reconfiguration scenarios include network initialization, insertion of devices, deletion of devices, topology changes that do not involve insertion or deletion of devices (such as link breaks, where a link connects a pair of devices), and combining of operating networks. In the context of this document, network initialization does not refer to the internal processes independently used by each device to initialize itself, but rather to the communication between interconnected devices required to establish knowledge of network topology and remapping of short addresses to long addresses.

There are several fundamental requirements that must be met by the mechanisms used for topology reconfiguration:

1. Ongoing traffic between unperturbed devices on networks undergoing reconfiguration shall continue to flow, assuming that there are multiple paths available for such traffic. In the event that the reconfiguration involves the temporary removal of physical routes on which traffic was flowing, standard protection switching mechanisms such as SONET-based line or path switching or other mechanisms for packet-switched networks are used to temporarily reroute the traffic to unaffected physical routes between nodes.
2. The mechanism shall be plug-and-play, e.g. determination of topology changes shall occur automatically and shall not require intervention from network management systems.
3. The communication mechanism between devices shall enable topology change information detected by a given device to propagate to all other devices on the virtual network. This can be done using a standard topology discovery mechanism or using other mechanisms. The choice of mechanism is based on the specific requirements of the individual virtual network.

Many current topology discovery mechanisms are distributed in the sense that each device in the network constructs and stores its own version of the network topology based on information received from other devices about their own neighboring devices, referred to in this document as neighbor status messages. A good example of such a mechanism is the link state protocol for broadcast of topology changes used in the OSPF routing protocol, described in the book "Interconnections, Second Edition" by Radia Perlman, Addison Wesley Longman, Inc., 2000, incorporated herein by reference in its entirety. The link state protocol, along with all other distributed topology discovery protocols known to the authors, relies on the mechanisms of age-out of topology information and reliable delivery using acknowledgement messages sent from the device receiving a topology message back to the source of the message.

The use of an age-out mechanism means that the topology stored at any device will become invalid after a configurable period of time. This means that neighbor status messages must be periodically sent by every device in the network, even if there is no change in the topology. This is inefficient both in terms of processing at each device and in terms of network bandwidth because changes in network topology are not frequent occurrences. A mechanism that removes the necessity for each device to age-out its topology would therefore be useful.

The use of reliable delivery of neighbor status messages through tracking of received acknowledgement messages at each device is a standard approach to ensure that all transmitted neighbor status messages are received, and thus that all devices construct a correct network topology. There remain transient scenarios, however, such as devices going down and coming back up, that can result in some devices not receiving all messages, and thus constructing an incorrect network topology that can result in other devices on the network becoming invisible. In packet-switched data networks, there has traditionally been no guarantee of reliable service, and thus no additional mechanisms to guarantee construction of a valid network topology at each device have been required. To transport telco-quality voice on DS1 or DS3 leased lines over a packet-switched network, however, extremely high reliability is required. A mechanism that validates the topology constructed at each device would therefore be useful.

There are currently no established mechanisms for topology reconfiguration in networks using dual mode addressing. What is needed for this type of networks is a mechanism that:

1. Enables topology reconfiguration and that meets the above general topology reconfiguration requirements.
2. Minimizes (and preferably eliminates) changes to management and control information (such as provisioning tables and routing tables internal to a device) due to switching between dual addressing modes necessitated by reconfiguration.
3. Enables re-establishment of short addresses as part of reconfiguration, e.g. that ensures the elimination of short address duplication when multiple networks are combined together.

SUMMARY

A dual addressing mode is described in which reduced-length addresses (referred to as short addresses) are substituted for standard addresses (referred to as long addresses) for traffic whose source or destination is internal to a given virtual network topology. Long addresses are globally unique, while short addresses are locally unique to a given virtual network. The required length of short addresses used for a given virtual topology is dependent on the number of devices reachable within the topology. For a virtual topology with less than 256 addressable devices, for example, 8-bit short addresses can be used.

When a node within the virtual network sees a packet with a short destination address in the header, the node understands the address to be within the virtual network and routes the packet accordingly. A node is defined as a point where traffic can enter or exit the ring. If a source address is a short address, the virtual network can identify the source within the virtual network. For packets originating in the virtual network whose destination is also in the virtual network, both the source and destination addresses can be short addresses.

A node within the virtual network that is also connected to an outside network may, optionally, receive a packet with long source and destination addresses from an outside network and look up a corresponding short address of the destination node in a look-up table memory. The node then replaces the long address with the short address and forwards the packet to the destination node in the virtual network. Similarly, a node in the virtual network transmitting a packet outside the network can use a short source address while the traffic is being routed within the virtual network. Thus, devices within a virtual network topology are addressable in a dual manner on the data link layer and/or network layer by traffic flowing internal to, or private to, the virtual network.

The invention results in roughly a 50% reduction in overhead for a Gigabit Ethernet-like MAC header, and a 30% reduction in overhead for an IP header. The use of a compressed MAC header results in, for example, an average increase in data-carrying capacity of 4% for Ethernet-based metropolitan-area rings carrying IP packets.

An address type field in the packet header allows the dual address formats to be distinguished by the transmitting and receiving devices so that both formats can be used interchangeably from packet to packet in a robust manner.

Also described is a technique for detecting a topology change in the network and automatically assigning source addresses to devices within the virtual network.

DETAILED DESCRIPTION OF THE EMBODIMENTS

The inventions described herein provide a flexible, dual addressing mechanism for devices in a defined virtual network topology. The devices within the virtual network may be routing/multiplexing devices with a short/long address translation mechanism. The entire virtual network may be private in the sense that it is isolated from the external world by a routing device or set of routing devices with a short/long address translation mechanism. Thus, the term "virtual network" could apply equally to, for example, the nodes of a metropolitan area fiber ring or a private corporate network isolated behind a corporate router. Virtual networks can optionally utilize private addressing (not visible to the rest of the world). For example, use of a specific header containing such addresses may be limited to use within the virtual network.

In addition, the inventions described herein provide a general topology discovery mechanism (not specific to virtual networks) that is reliable and that does not require rediscovery of the topology if no change has occurred. This mechanism utilizes a session identifier that devices in the network place on all neighbor status messages sent on the network. All devices store the current session number and update it based on session numbers used in messages received from the network. Any device that, for example, detects a change in its neighbor status information increments its stored session number and uses that number on a transmitted neighbor status message. The detection of an incremented session number signals to other devices on the network that a new round of topology discovery has started. The mechanism also utilizes a topology validation algorithm that protects against the construction of an invalid topology. If the validation fails, the valid topology currently stored at the node is not perturbed. This is essential to ensure that telco-grade leased line connections are not impacted unnecessarily.

In addition, the inventions described herein provide a mechanism for management and assignment of dual-mode network addresses in topology reconfiguration scenarios.

Figure 1:
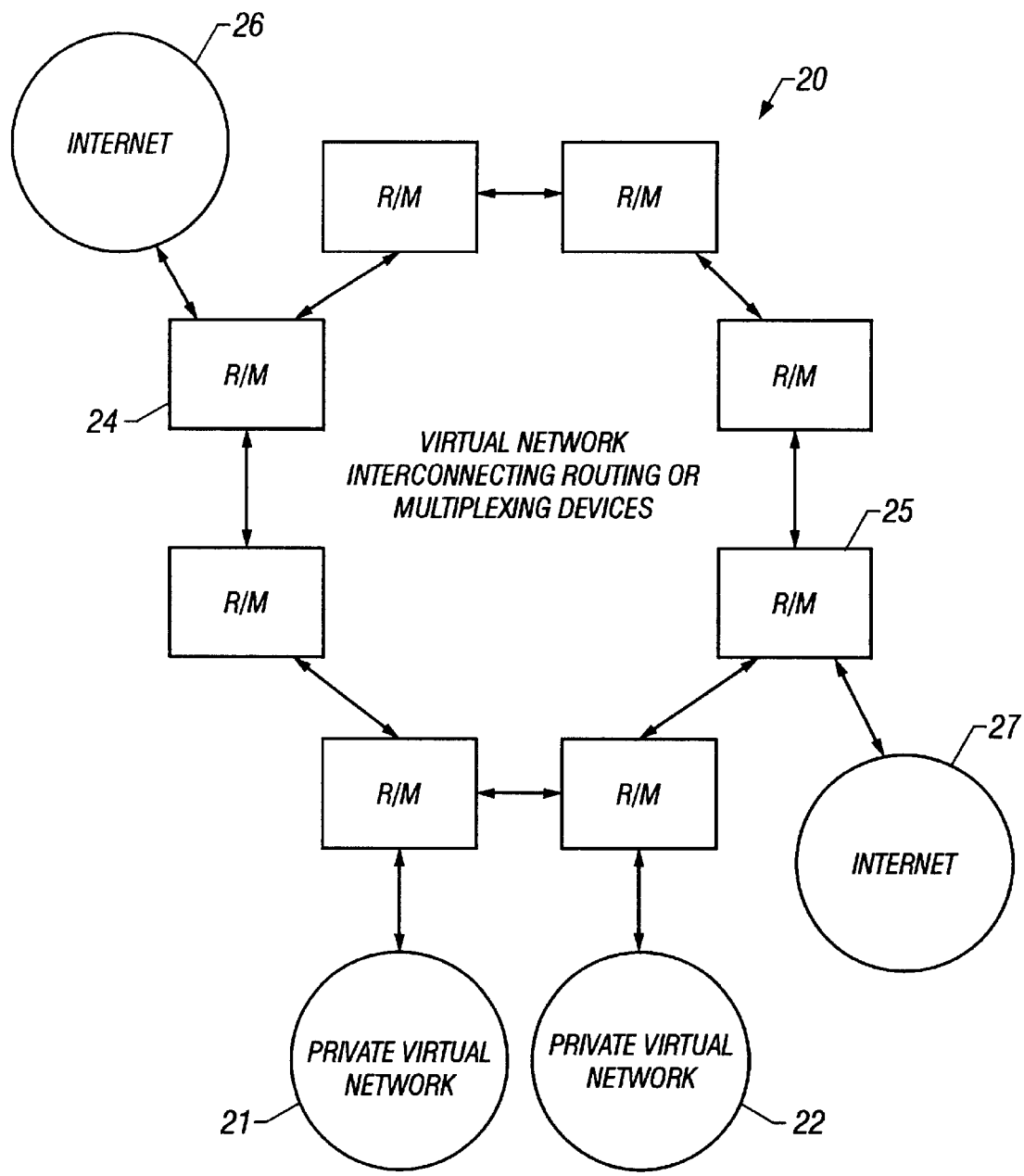
FIG. 1 illustrates multiple, interconnected virtual networks, with certain nodes also connected to the internet.

Examples of two types of virtual networks are shown in FIG. 1. A metropolitan area fiber ring, or more generally, a virtual network 20 interconnecting high-speed routing/multiplexing (R/M) devices, is shown along with private virtual networks 21, 22 isolated behind routing devices. The private virtual networks 21, 22 may be a ring of nodes that have routing capability. The three virtual networks 20–22 are candidates for application of the present invention.

Nodes 24 and 25 in network 20 are connected to open, public internets 26 and 27, respectively. Since the internets 26 and 27 are large, constantly changing, and composed of many independent and diverse modules, the internets 26 and 27 are not good candidates for the present invention.

Packets passed within a single virtual network 20–22 can be addressed using compressed addressing (short addresses) to increase data-carrying efficiency. Packets that leave the virtual network 20–22 will have their virtual network (short) addresses stripped or replaced with externally valid (long) addresses. In the event of virtual network reconfiguration, such as the combining of metropolitan area fiber rings, it must be possible for devices in the virtual network to simultaneously understand both short and long addresses to facilitate management and reconfiguration of such networks.

Dual Addressing

The purpose of dual addressing for each device in a virtual network is to enable optional reduction of packet header overhead for traffic passing between such devices. Specifically, nodes within the virtual network can choose to use short addresses for certain classes of traffic under certain conditions, and long addresses for the same or other classes of traffic under other conditions. A possible set of rules could include use of short addresses for data packets when the virtual network topology is stable under some criterion and use of long addresses for control packets under all conditions and for data packets when the virtual network topology is in flux. This causes overhead savings for the vast majority of packets passing between nodes in the virtual network without giving up the unique device addressing provided by long addresses. Any device in the virtual network must therefore be able to distinguish between short and long addresses on a packet-by-packet basis.

The length of short addresses in bits is determined most simply by the number of bits needed to provide a unique short address to each device in the maximum-sized virtual network. For example, in a virtual network containing up to 256 devices, 8 bits is sufficient as the length of the short address.

The overhead savings that result from usage of an 8-bit short address are illustrated through the following example. 48-bit Ethernet addresses are assumed as the long address format on the data link layer. The average length of IP packets is roughly 250 bytes, and the average length of circuit-emulated voice packets is assumed to be 150 bytes. The distribution of IP data and voice packets is assumed to be 50% each. Then the average packet length before encapsulation in an Ethernet frame is 200 bytes. The encapsulation of each packet in an Ethernet frame results in the addition of a minimum of 19 bytes of MAC-layer overhead to the IP packet. A change from 48-bit MAC addresses to 8-bit MAC addresses results in roughly a 50% reduction in MAC-layer overhead, and an average increase in data-carrying capacity of roughly 4.5%. It is assumed in the above calculation that control traffic is a minimal percentage of the total traffic in the network. A similar type of calculation can be easily done for compressed IP addresses.

Algorithm and Packet Header for Dual Addressing

In one embodiment, the packet header used in virtual networks that support dual addressing includes an address type field prior to each of the source and destination addresses. This address type field can be as short as 1 bit in length. In one embodiment, the address type field is one-half byte and precedes both addresses.

Figure 2:
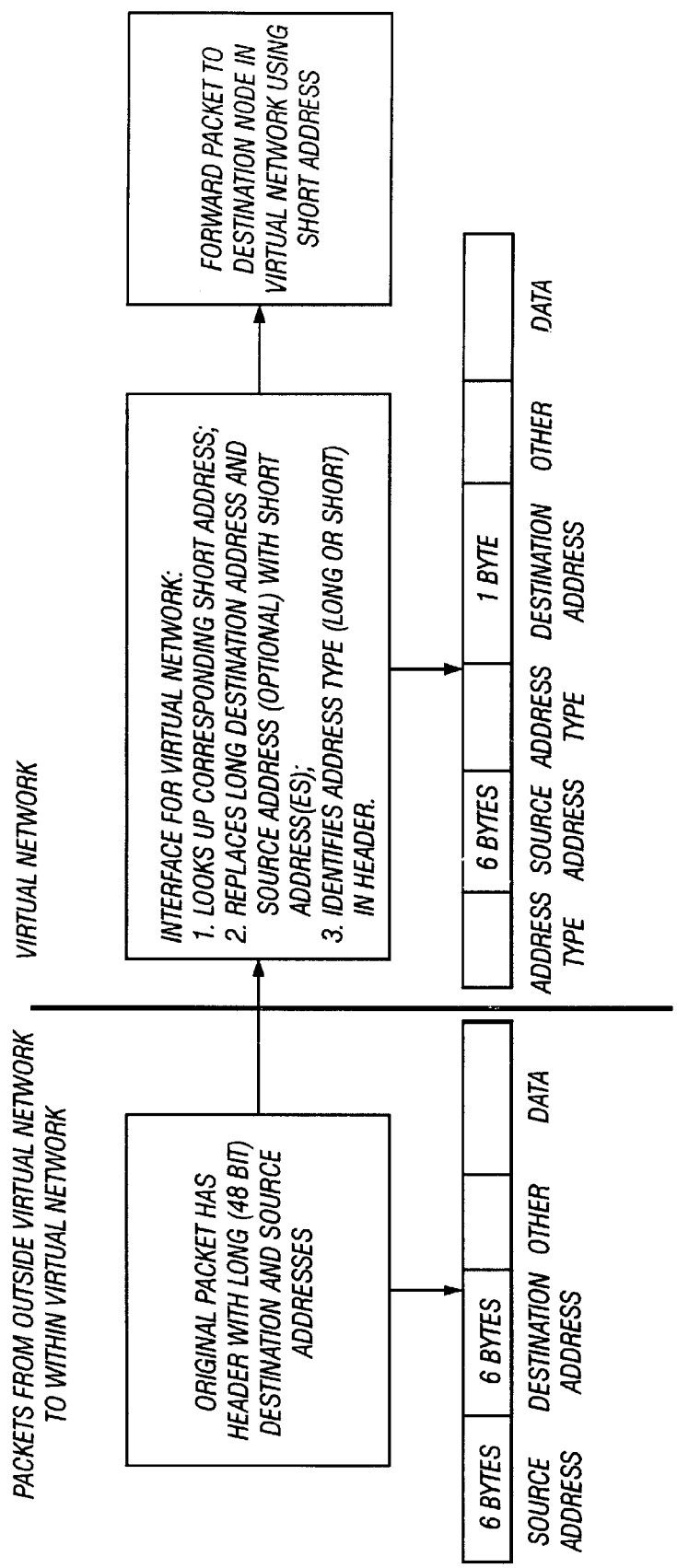
FIG. 2 is a flowchart of events when packets from outside a virtual network are transmitted within the virtual network. Address length values used are representative of Ethernet-length long addresses and 1-byte short addresses.

FIG. 2 is a flowchart of steps taken when a packet generated external to the virtual network is destined for a device within the virtual network, and the dual addressing capabilities are used. A 48-bit long address is assumed.

In FIG. 2, an original packet generated by a device external to the virtual network contains a conventional header with a source address of 48 bits and a destination address of 48 bits.

At the interface between the external network and the virtual network, where the dual addressing conversion occurs, a processor in the interface node, such as in a packet processor in node 24 in FIG. 1 connected to the internet 26, performs the following tasks. The interface node may also be the node coupled to either of the private virtual networks 21 and 22.

The processor looks up, in a look-up table, a short address (e.g., 1 byte) corresponding to the long destination address in the header. A corresponding short address means that the destination device is within the virtual network associated with the interfacing device. The processor may also replace the long source address with a corresponding short address; however, replacing the long source address with a short source address prevents identification of the source device in the external network. However, if the source only needs to be known as the interfacing device, then the short source address may replace the long source address.

After the look up, the long addresses in the packet header are replaced by the corresponding short addresses, and the address type (long or short) is identified in the header. Accordingly, the 6 bytes of the long source or destination address are replaced by a single byte address in the header.

The packet with the shortened header is then forwarded to the destination node within the virtual address using the short address. Basically, each node in the virtual network forwards the packet until it reaches the destination node, where the short destination address matches the short address of the node. The node then removes the packet from the network. Of course, if using a short address is not appropriate for any reason, the virtual network does not replace the long address with the short address.

If the virtual network is acting as a connection between two external networks coupled together via the virtual network, the ingress node into the virtual network may convert the long addresses, as necessary, to the short addresses, and the egress node of the virtual network can convert the short addresses back to the long addresses for forwarding outside of the virtual network.

As seen, the number of bits transmitted within the virtual network for each packet is reduced, thus giving the virtual network greater capacity.

Figure 3:
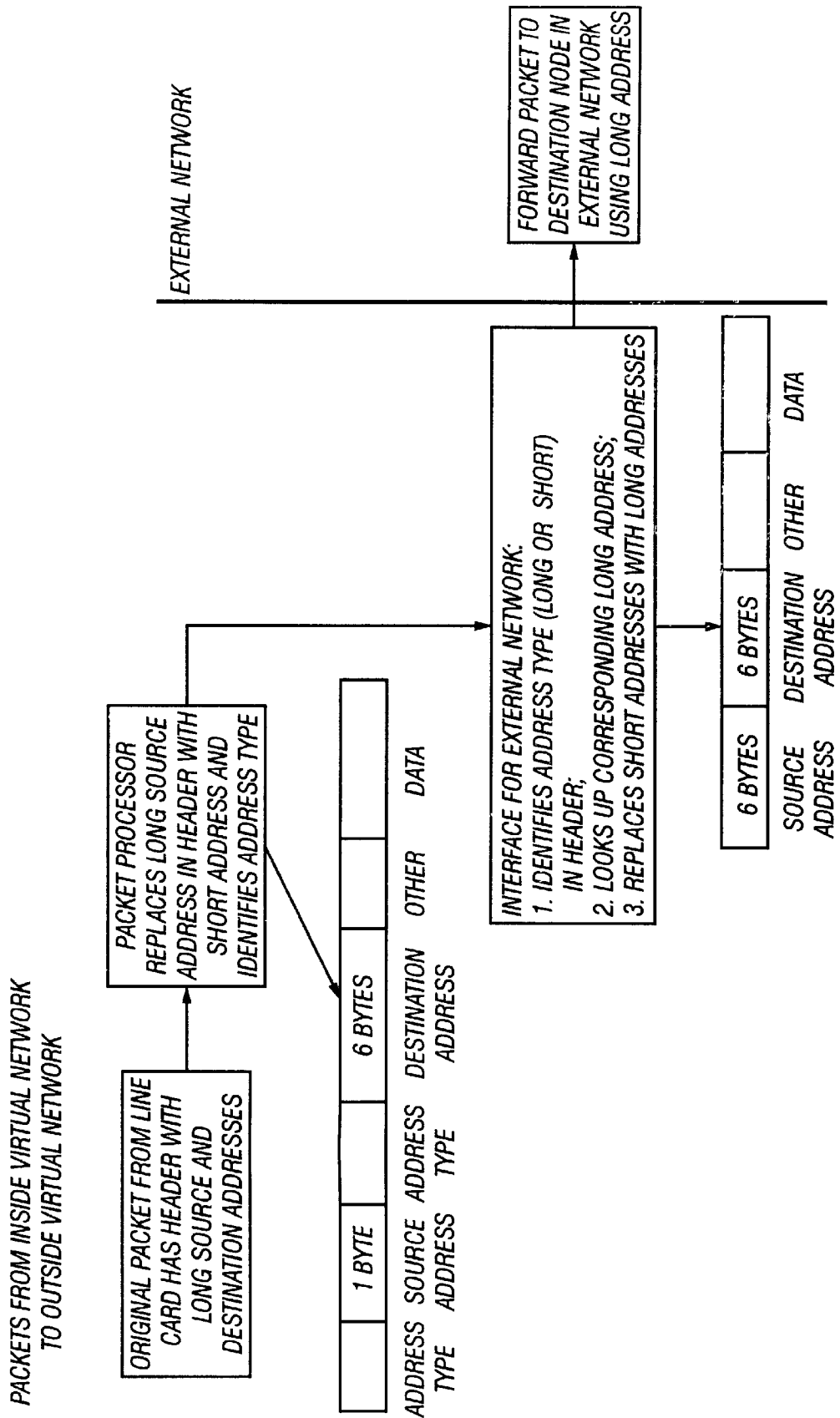
FIG. 3 is a flowchart of events when packets from inside the virtual network are transmitted outside the virtual network.

FIG. 3 is a flowchart of steps taken when a packet generated internal to the virtual network is destined for a device outside of the virtual network. This applies even when the packet is destined for a different virtual network with dual addressing capabilities.

An original packet generated at a node within the virtual network contains the long source and destination addresses. This original packet is typically output from a tributary interface card within a node. A packet processor within the node receives the original packet and, using a look-up table, identifies the corresponding short source address, replaces the long source address in the header with the short address, and identifies the address type. This also may be done with the destination address if appropriate. The packet with the short address in the header is then forwarded around the virtual network to the node that interfaces with the external network. At this point, the short address must be converted into the long address before transmitting the packet outside of the virtual network. To this end, a packet processor in the interface node looks up the corresponding long address and replaces the header containing the short address with a header containing the long address.

The resulting packet is then forwarded outside the virtual network. Thus, while the packet is being transmitted around the virtual network, the size of the packet is reduced, effectively increasing the capacity of the virtual network.

Figure 4:
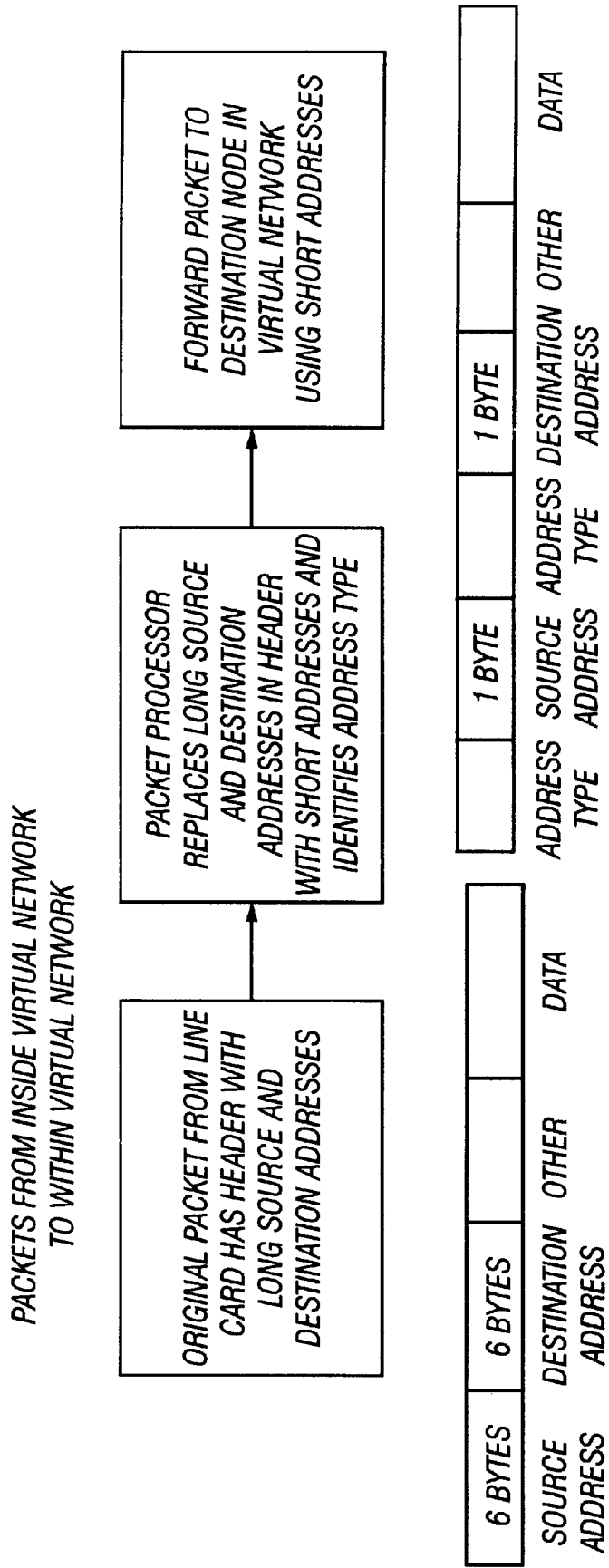
FIG. 4 is a flowchart of events when packets from inside the virtual network are destined for a node within the virtual network.

FIG. 4 is a flowchart of steps taken when a packet generated internal to the virtual network is destined for a device also within the virtual network. In FIG. 4, an original packet from a tributary interface card in a node within the virtual network will typically have a header with conventional long source and destination addresses.

A packet processor in the node identifies a corresponding short address, if any, in a look-up table for each of the long addresses in the header and replaces the packet header with a header containing the short addresses and the address type. Since both the source address and destination address can be reduced in this step, the header is reduced by about 10 bytes, resulting in an approximately 50% reduction in overhead for a Gigabit Ethernet-like MAC header and a 30% reduction in overhead for an IP header.

The packet with the shortened header is then forwarded in the virtual network to the destination node identified by the short address. The packet is then consumed by the node if the node's short or long address matches the destination address in the virtual network header. If the transmission around the virtual network is in the broadcast mode, the packets are consumed by each node and forwarded by the node if the node's short or long address matches the destination address in the virtual network header. If neither the node's short or long address matches the destination address in the virtual network header, the node then forwards the packet to its adjacent node via an electrical or optical link connecting the nodes. In one embodiment, the virtual network is a ring of nodes with one ring of optical fiber or electrical cable transmitting in a clockwise direction and another ring transmitting in a counter-clockwise direction.

There may be other criteria that impact whether packets are consumed and/or forwarded or dropped by a given device. The above algorithm addresses the use of short and long addresses only.

Each node has a table of all devices within the virtual network containing, for each device, at least its long address and its short address.

Description of Hardware

Figure 5:
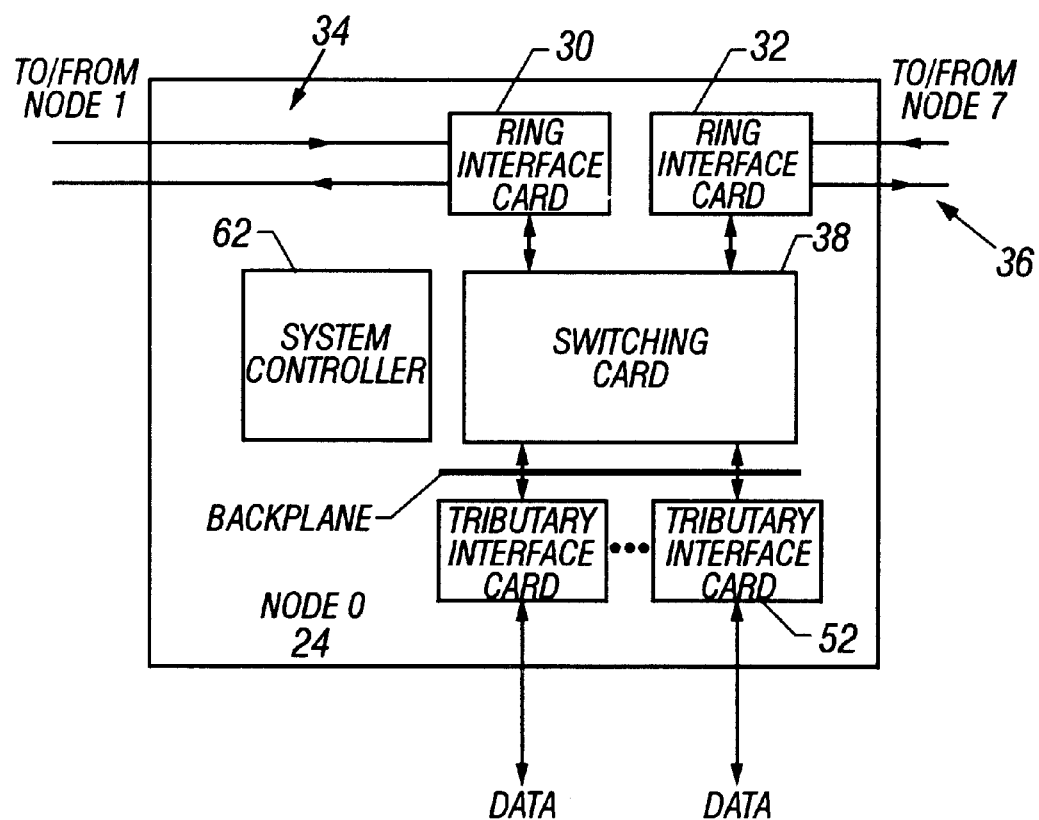
FIG. 5 illustrates pertinent functional units in a node of a virtual network.

FIG. 5 illustrates the pertinent functional units within a single node, such as node 24 within the virtual network of FIG. 1. Such a node in a ring may also be found in the private virtual networks 21 and 22 in FIG. 1. Each node is connected to adjacent nodes by ring interface cards 30 and 32. These ring interface cards convert the incoming optical signals on fiber optic cables 34 and 36 to electrical digital signals for application to a switching card 38.

Figure 6:
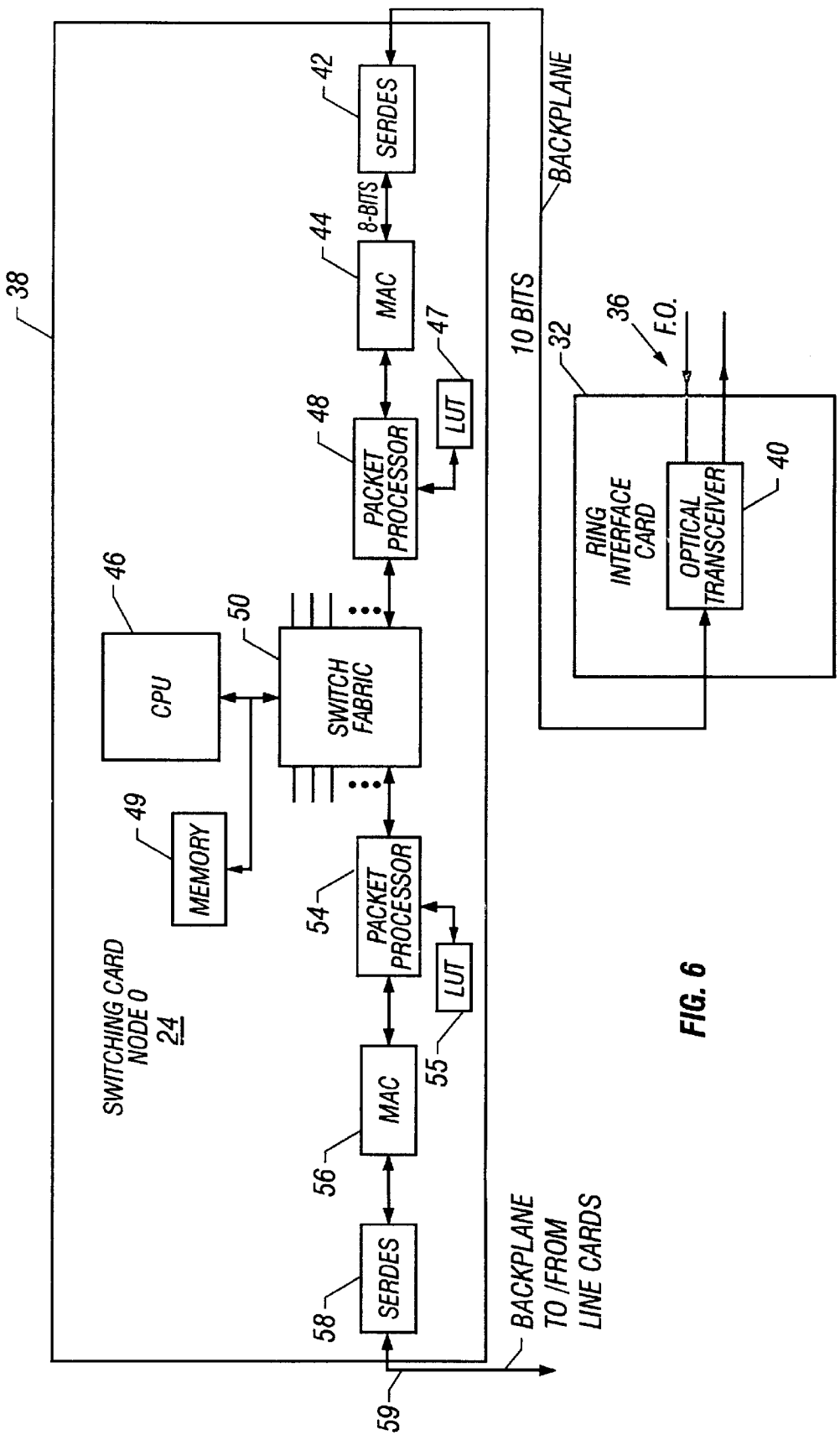
FIG. 6 illustrates additional detail of the switching card of FIG. 5.

FIG. 6 illustrates one ring interface card 32 in more detail showing the optical transceiver 40. An additional switch in card 32 may be used to switch between two switching cards for added reliability. The optical transceiver may be a Gigabit Ethernet optical transceiver using a 1300 nm laser, commercially available.

The serial output of optical transceiver 40 is converted into a parallel group of bits by a serializer/deserializer (SERDES) 42 (FIG. 6). The SERDES 42, in one example, converts a series of 10 bits from the optical transceiver 40 to a parallel group of 8 bits using a table. The 10 bit codes selected to correspond to 8 bit codes meet balancing criteria on the number of 1's and 0's per code and the maximum number of consecutive 1's and 0's for improved performance. For example, a large number of sequential logical 1's creates baseline wander, a shift in the long-term average voltage level used by the receiver as a threshold to differentiate between 1's and 0's. By utilizing a 10-bit word with a balanced number of 1's and 0's on the backplane, the baseline wander is greatly reduced, thus enabling better AC coupling of the cards to the backplane.

When the SERDES 42 is receiving serial 10-bit data from the ring interface card 32, the SERDES 42 is able to detect whether there is an error in the 10-bit word if the word does not match one of the words in the table. The SERDES 42 then generates an error signal. The SERDES 42 uses the table to convert the 8-bit code from the switching card 38 into a serial stream of 10 bits for further processing by the ring interface card 32. The SERDES 42 may be a model VSC 7216 by Vitesse or any other suitable type.

A media access controller (MAC) 44 counts the number of errors detected by the SERDES 42, and these errors are transmitted to the CPU 46 during an interrupt or pursuant to polling mechanism. The CPU 46 may be a Motorola MPC860DT microprocessor. The MAC 44 also removes any control words forwarded by the SERDES and provides OSI layer 2 (data-link) formatting for a particular protocol by structuring a MAC frame. MACs are well known and are described in the book "Telecommunication System Engineering" by Roger Freeman, third edition, John Wiley & Sons, Inc., 1996, incorporated herein by reference in its entirety. The MAC 44 may a field programmable gate array.

A packet processor 48 associates each of the bits transmitted by the MAC 44 with a packet field, such as the header field or the data field. The packet processor 48 then detects the header field of the packet structured by the MAC 44 and may modify information in the header for packets not destined for the node. Examples of suitable packet processors 48 include the XPIF-300 Gigabit Bitstream Processor or the EPIF 4-L3C1 Ethernet Port L3 Processor by MMC Networks, whose data sheets are incorporated herein by reference.

The packet processor 48 interfaces with an external search machine/memory 47 (a look-up table) that contains routing information to route the data to its intended destination.

A memory 49 in FIG. 6 represents other memories in the node, although it should be understood that there may be distributed SSRAM, SDRAM, flash memory, and EEPROM to provide the necessary speed and functional requirements of the system.

The packet processor 48 provides the packet to a port of the switch fabric 50, which then routes the packet to the appropriate port of the switch fabric 50 based on the packet header. If the destination address in the packet header corresponds to the address of node 24 (the node shown in FIG. 6), the switch fabric 50 then routes the packet to the appropriate port of the switch fabric 50 for receipt by the designated node 24 tributary interface card 52 (FIG. 5). If the packet header indicates a destination address other than to node 24, the switch fabric 50 routes the packet through the appropriate ring interface card 30 or 32 (FIG. 5). Control packets are routed to CPU 46. Such switching fabrics and the routing techniques used to determine the path that packets need to take through switch fabrics are well known and need not be described in detail.

One suitable packet switch is the MMC Networks model nP5400 Packet Switch Module, whose data sheet is incorporated herein by reference. In one embodiment, four such switches are connected in each switching card for faster throughput. The switches provide packet buffering, multicast and broadcast capability, four classes of service priority, and scheduling based on strict priority or weighted fair queuing.

A packet processor 54 associated with one or more tributary interface cards (e.g., tributary interface card 52) receives a packet from switch fabric 50 destined for equipment (e.g., a LAN) associated with tributary interface card 52. Packet processor 54 is bi-directional, as is packet processor 48. Packet processors 54 and 48 may be the same model processors. Generally, packet processor 54 detects the direction of the data through packet processor 54 as well as accesses a routing table memory 55 for determining some of the desired header fields and the optimal routing path for packets heading onto the ring, and the desired path through the switch for packets heading onto or off of the ring. When the packet processor 54 receives a packet from switch fabric 50, it forwards the packet to a media access control (MAC) unit 56, which performs a function similar to that of MAC 44, which then forwards the packet to the SERDES 58 for serializing the data. SERDES 58 is similar to SERDES 42.

When the packet processor 54 receives packets from switch fabric 50, processor 54 identifies the address type field, if any, in the header and, if an address is a short address, processor 54 looks up the corresponding long address in memory 55 (or a different memory). The processor 54 then replaces the short address with the long address and forwards the packet to the MAC unit 56. In the other direction, packet processor 54 receives packets originating from one or more tributary interface cards via MAC 56. The packets contain a long destination address. Processor 54 then performs a lookup to determine the correct short address to use to replace the long address. This lookup may use a hash function to increase lookup speed. If it is necessary for other reasons to balance loading between packet processor 54 and other similar packet processors on, for example, the tributary interface cards, the determination of the correct short address to use may also be performed in a packet processor located on a tributary interface card. All traffic that packet processor 54 receives via MAC 56 also passes through one or more packet processors on the tributary interface card. Since the packet processor 54 is programmable, one skilled in the art could easily write a program for controlling processor 54 to carry out the present invention.

Packet processor 48 is programmed to route traffic based on either the long address or short address. If processor 48 were in a node that interfaced between a dual-addressing virtual network and an external network, then processor 48 would be programmed to perform the long/short address replacement, using memory 47, as previously described.

In another embodiment, processor 48 performs all the long/short address conversions instead of processor 54.

The output of the SERDES 58 is then applied to a particular tributary interface card, such as tributary interface card 52 in FIG. 5, connected to a backplane 59. The tributary interface card may queue the data and route the data to a particular output port of the tributary interface card 52. Such routing and queuing by the tributary interface cards may be conventional and need not be described in detail. The outputs of the tributary interface cards may be connected electrically, such as via copper cable, to any type of equipment, such as a telephone switch, a router, a LAN, or other equipment. The tributary interface cards may also convert electrical signals to optical signals by the use of optical transceivers, in the event that the external interface is optical.

When the packet processor 54 receives a packet originating from one of the tributary interface cards 52 in the node, the packet processor 54 replaces the long addresses with short addresses, as appropriate, using memory 55, as previously described. In one embodiment, packet processor 54 first determines the route in the routing table memory 55 using the long address before converting the short address to avoid having to change the routing table when the short addresses are changed for any reason.

The CPU 46, in one embodiment, is always addressed by control packets having the long address for reliability considerations. CPU 46 manages the ring control functions, such as setting up new addresses in case there is a change in the virtual network.

For example, if rings are combined, new virtual short addresses need to be assigned. Each of the nodes periodically transmits their full address to an adjacent node. If there is a change in topology of the network, the node broadcasts the change. A master CPU 46 in the network then reallocates the short addresses to all the nodes in the network, or each CPU 46 can perform this on a distributed basis. All the nodes then update their memories with the new topology addresses.

In addition, the CPU 46 stores the session number in memory along with all received neighbor status messages numbered with the current session number as part of ongoing topology discovery. The CPU 46 executes the software application(s) that manage all aspects of topology discovery, including session number management and topology validation.

The system controller 62 obtains status information from the node and interfaces with a network management system. This aspect of the node is not relevant to the invention. The system controller can be programmed to report on various tests of the network.

In one embodiment, the above-described hardware processes bits at a rate greater than 1 Gbps.

A further description of the hardware in FIGS. 5 and 6 is found in the co-pending application entitled "Dynamically Allocated Ring Protection and Restoration Technique," Ser. No. 09/519,442, filed herewith, by Robert Kalman et al., assigned to the present assignee and incorporated herein by reference.

The above description of the hardware used to implement one embodiment of the invention is sufficient for one of ordinary skill in the art to fabricate the invention since the general hardware for packet switching and routing is very well known. One skilled in the art could easily program the MACs, packet processors, CPU 46, and other functional units to carry out the steps describe herein. Firmware or software may be used to implement the steps described herein.

Dual-Mode Network Address Assignment in Topology Reconfiguration Scenarios

This section describes how the short addresses are automatically assigned to devices in the virtual network when the topology is reconfigured. This is referred to as plug-and-play.

It is assumed that all inserted devices made visible to the virtual network are intended to be part of the virtual network. If this is not the case, then the devices must be preconfigured, or use commanding from a management system, to indicate which devices are to use the dual-addressing feature.

Some of the components of the plug-and-play technique include:

1. An algorithm for mapping addressing modes to different types of network traffic on the data link and/or network layer internal to, or private to, the virtual network;
2. An address mapping mechanism that allows knowledge of short addresses to be isolated to a minimum of components within each device, thus enabling fast and simple re-mapping of long addresses to short addresses upon virtual network topology changes;
3. An efficient algorithm for network topology construction at each device based on status messages from each device in the network;
4. An automatic, plug-and-play algorithm for virtual network initialization;
5. An automatic, plug-and-play algorithm for insertion of devices to the virtual network;
6. An automatic, plug-and-play algorithm for deletion of devices from the virtual network;
7. An automatic, plug-and-play algorithm for handling virtual network topology changes that do not involve insertion of devices in or deletion of devices from the network; and
8. An automatic, plug-and-play algorithm for combining of networks, each of which contains devices with previously assigned short addresses and which contains ongoing traffic connections.

Dual mode addressing in virtual networks, described above, derives the benefit of greater data-carrying efficiency through the optional use of a short addressing mode per device, while at the same time maintaining the convenience of globally unique long addresses per device for management of topology reconfiguration scenarios. Topology reconfiguration scenarios include network initialization, insertion of devices, deletion of devices, topology changes that do not involve insertion or deletion of devices, and combining of operating networks. In the context of this document, network initialization does not refer to the internal processes independently used by each device to initialize itself, but rather to the communication between interconnected devices required to establish knowledge of network topology and remapping of short addresses to long addresses.

There are several fundamental requirements that should be met by the mechanisms used for topology reconfiguration:

Ongoing traffic between unperturbed nodes on networks undergoing reconfiguration shall continue to flow, assuming that there are multiple paths available for such traffic. In the event that the reconfiguration involves the temporary removal of physical routes on which traffic was flowing, standard protection switching mechanisms such as SONET-based line or path switching or other mechanisms for packet-switched networks are used to temporarily reroute the traffic to unaffected physical routes between nodes.

The mechanism shall be plug-and-play, e.g., determination of topology changes and resulting short address changes shall occur automatically and shall not require intervention from network management systems.

The mechanism shall minimize (and preferably eliminate) changes to management and control information (such as provisioning tables and routing tables internal to a device) due to switching between dual addressing modes necessitated by reconfiguration.

The communication mechanism between devices shall enable topology change information detected by a given device to propagate to all other devices on the virtual network. This can be done using a standard mechanism such as the link state protocol for broadcast of topology changes used in the OSPF routing protocol, or using other mechanisms. The choice of mechanism is based on the specific requirements of the individual virtual network.

What is needed is a mechanism that enables topology reconfiguration and enables re-establishment of short addresses as part of reconfiguration to ensure the elimination of short address duplication when multiple networks are combined together.

To ensure robust network behavior during topology reconfiguration, it is important that control messages containing topology information use the unique long addresses, both for source and destination information (delivery of the control messages) as well as for references to topology information within the messages. The use of long addresses for control functions guarantees that there is never address duplication when devices are inserted to an operating network, or when multiple operating networks are combined. Since control messaging takes up a small percentage of total traffic during normal network operations, the simplest and most reliable approach is to always use long addresses for control messaging.

For regular data delivery, it is important that an addressing mode be provided for data delivery during periods when the network topology is not stable and known. These periods correspond to the waiting time required to ensure that the topology has restabilized and that short addresses have been reassigned (after a control message indicating a change in topology is received by a device). In particular, if two operating networks are combined and there is any duplication in the complete set of short addresses used across both networks, the mapping of short addresses to long addresses will need to be redone for at least the nodes for which short address duplication has occurred. To ensure that data is not lost or delivered to an incorrect destination during the period of short address remapping, data either from or destined to the affected nodes must switch to use of long addresses for data delivery. This is the case irrespective of whether the short address remapping is done in a distributed fashion (independently at each device) or by a global master device and then distributed to all other devices in the network. If such a mechanism is not provided, loss or incorrect delivery of some packets is unavoidable during the transition period.

A simple implementation option is to remap all short addresses to long addresses upon any topology change based on a standard algorithm, such as: (short address 1, smallest long address in a sorted list), (short address 2, 2nd smallest long address in a sorted list), etc. The disadvantage of this approach is that some network capacity is temporarily lost because all traffic in the network must switch to 48-bit addresses for a short period. The advantage of this approach is its simplicity, since the same action (remapping of short addresses) is done after any topology change.

Another simple implementation option is to do address mapping on a distributed basis (at each device) rather than at a global master device. The disadvantage of this approach is that all networks must then have knowledge of the network topology, which is not required in SONET networks but which is required in capacity-efficient packet-switched networks where each node routes packets to destinations on a least-cost path. The advantage of this approach is that there is then no need to handle election of a new global master device in the event that the original global master goes down.

When changes in addressing modes need to be made at a device, it is strongly desirable from a reliability perspective to minimize the number of independent components that are impacted (in terms of changing data in memory, etc.). This is equivalent to minimizing the number of components that have knowledge of short addresses. In one embodiment, packet processor 54 (FIG. 6) performs the short/long address conversion using a table, such as memory 55. The programmable packet processor, in addition to enabling interchange of long and short addresses, is controllable based on the previously stated rules. For packets exiting a device onto the virtual network, it determines whether to change long addresses (used in creation of virtual network headers elsewhere in the device) to short addresses based on whether the packet is a control packet or a data packet, and based on whether short addresses are in the process of being remapped to long addresses.

Packet processor 48 is controllable as follows based on the previously stated rules. For packets entering a device from the virtual network, it recognizes any valid combination of short and long addresses. For example, it must be able to seamlessly accept interleaved data packets from the same source, some using long addresses and others using short addresses.

Other than this packet processor 54, packet processor 48, and CPU 46, no other entity within a device needs to have any knowledge of short addresses. For example, configuration/provisioning tables and routing tables stored within the device should use only long addresses to eliminate perturbation in the event of topology reconfiguration. It is important that configuration/provisioning tables stored in memory accessible to packet processors on the tributary interface cards not be impacted, since an address change in such tables may result in the re-initialization of network traffic connections and thus the disturbance of ongoing traffic. Other embodiments may choose to perform interchange of long addresses and short addresses in packet processors located on the tributary interface cards. This interchange may be done in separate operations independent of configuration/provisioning tables.

Topology Construction/Reconfiguration Algorithm

A topology construction/reconfiguration algorithm using topology status information provided by devices in the network is required to determine the long addresses of all devices in the virtual network, to check if the topology is complete, and to then map short addresses to each of the long addresses in the topology. Our specific approach, which handles all cases (initialization, insertion of devices, deletion of devices, span status changes, and combining of networks) has the following steps:

Each device finds out the long address of each of its neighboring devices via a control packet sent from each device to each of its neighbors. This neighbor information packet can be sent either periodically, on request (in response to a neighbor request packet), or upon detection of a topology change impacting the contents of the neighbor information packet. It is important to note that each device is responsible for reporting only on ingress neighbors, e.g., neighbors that send data received by the device. The device does not necessarily have two-way physical connectivity with its neighbors.

The neighbor request packet must contain at least an indication of message type, a source device address, a destination device address, and a time-to-live identifier. It may optionally contain (but not be limited to) an indication of which software application is the receiving application, an indication of message priority and/or class, an error detection or error correction code (such as a frame error checksum), an address type field (for networks using dual mode addressing), a source port address distinct from the source device address, and a destination port address distinct from the destination device address. This information may be contained in a generic packet header used for control messages only, or may be contained in a generic packet header that is common to all packets transmitted in the network, or may be contained in a control message header following a generic packet header. The neighbor request packet, when sent, can be generically sent out on all egress interfaces of a device. Since a device cannot be assumed to know the device addresses of its neighbors, the time-to-live field is essential. The destination device address may be set to a generic broadcast address, but the time-to-live identifier must be set to a single hop so the packet is not forwarded beyond the immediate neighbors of the sending device.

The neighbor information packet contains the identical information to the neighbor request packet except that it additionally must contain the session identifier and the interface identifier of the sending device. The inclusion of the session number provides the mechanism for a newly inserted device (or a device just powering up from a failure) to find out the correct session identifier to use on the neighbor status message described next. The inclusion of the interface identifier is necessary for resolution of all topology change scenarios for two-device networks, since the addresses of the devices themselves are not sufficient to distinguish between multiple interfaces during failure scenarios. A further description of this is scenario is found in the co-pending application entitled 'Dynamically Allocated Ring Protection and Restoration Technique,' by Robert Kalman et al., Ser. No. 09/519,442, filed on Mar. 3, 2000, assigned to the present assignee and incorporated herein by reference. The neighbor information packet also needs a time-to-live field set to a single hop. This is because if a device has an egress interface to a neighbor but no ingress interface from that neighbor, it must send the neighbor information packet periodically to that neighbor without necessarily having knowledge of that device's address. It would then use a generic broadcast address as the destination device address, as for the neighbor request packet.

Upon collection of information from neighbor information packets, each device may broadcast at least the following information in a neighbor status message: all information contained in the neighbor information packet, and, for each ingress neighbor, the 48-bit address of that neighbor and the status of the physical span interconnecting the neighbor to the device. Optionally, the neighbor status message may also contain a port address distinct from the device address for each ingress neighbor. The time-to-live field is set to a configurable value (usually much larger than 1, depending on the size of the network). The broadcast is removed from the network by any device that has already sent out the same message on all of its ingress interfaces. This can be handled using the same approach as used in the OSPF link state protocol, described in the book "Interconnections, Second Edition" by Radia Perlman, Addison Wesley Longman, Inc., 2000, incorporated herein by reference in its entirety. In a mesh network, the broadcast can be managed with a state at each device interface indicating whether a neighbor status message from a given source for a given session was received on that interface or transmitted on that interface (to ensure that broadcast storms do not occur). In a ring network, it is not essential that such a state be employed, since there is no harm in duplicate neighbor status messages being received twice as handling of such messages is idempotent.

The information must be broadcast upon change in topology from the previously transmitted neighbor status message with a session number larger than the largest detected by the node based on received messages from other nodes. The incrementing of the session number above the current value indicates whether a topology change is newly detected by a device. The number of bytes allocated to the session number in the neighbor status message should be at least two to render session number rollovers infrequent. When a rollover does occur, it can be handled using the well-known circular sequence number wraparound algorithm used in the OSPF routing protocol. This algorithm is described in the book "Interconnections, Second Edition" by Radia Perlman, Addison Wesley Longman, Inc., 2000, incorporated herein by reference in its entirety. The status is a number that indicates not only whether the span is "up" or "down," but also the level of degradation of span bit error rate performance, if such degradation exists.

The broadcast may or may not be reliable. It is not essential that the broadcast be reliable because broadcasts that are not received can be detected as part of topology validation, described later in this section. For situations where speed of response is essential (such as during rerouting scenarios in the event of link failures), the broadcast may be sent multiple times.

Any device that receives a neighbor status message with a session number greater than its current session number will increment its session number to the received session number, and broadcast its neighbor status information. If the session number is equal to the current session number, the device will not broadcast but may send an acknowledgement of receipt of the neighbor status message. If the session number is less, the device may do nothing or may notify the source device that its session number is out of date.

Upon broadcast or receipt of a neighbor status message with a new session number, each device switches to use of long addresses for data if dual-mode addressing is used. (Each device is already using long addresses if dual-mode addressing is not used.) This step may occur for any type of topology change for simplicity of implementation.

Each device buffers all received neighbor status messages of the current session. (It does not yet discard the last complete topology constructed from a previous session.) Starting with itself, each device constructs an internal software representation of the topology. There are many possible internal representations, one of which is given here. Each element of the internal software representation contains the following fields: original device long address, long address of neighboring device on each ingress interface, ingress span status on each ingress interface, pointer from the original device to each neighboring device on each neighbor span, ingress distance from source device (device doing the topology construction) to device contained in the element, reverse pointer from the original device to each neighboring device that has the original device on an ingress span, and egress distance from device contained in the element to source device.

Figure 7:
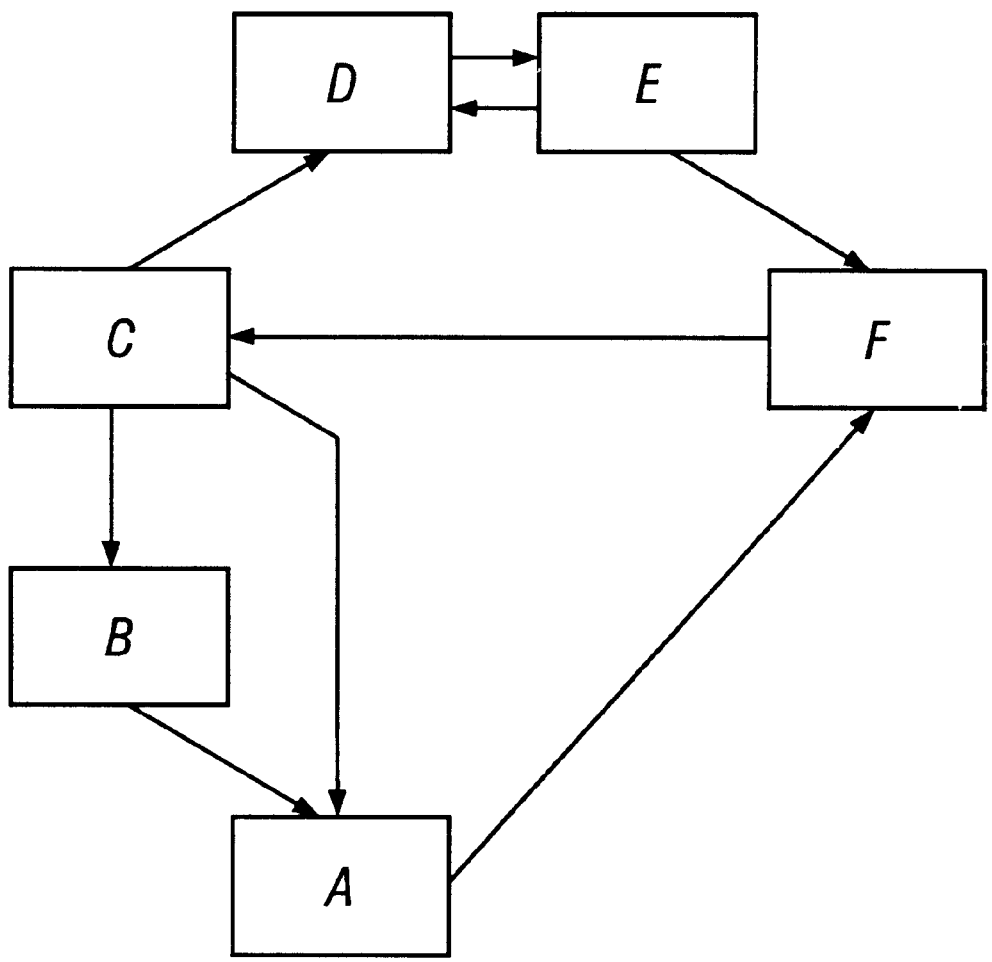
FIG. 7 illustrates a virtual network topology.
Figure 8:
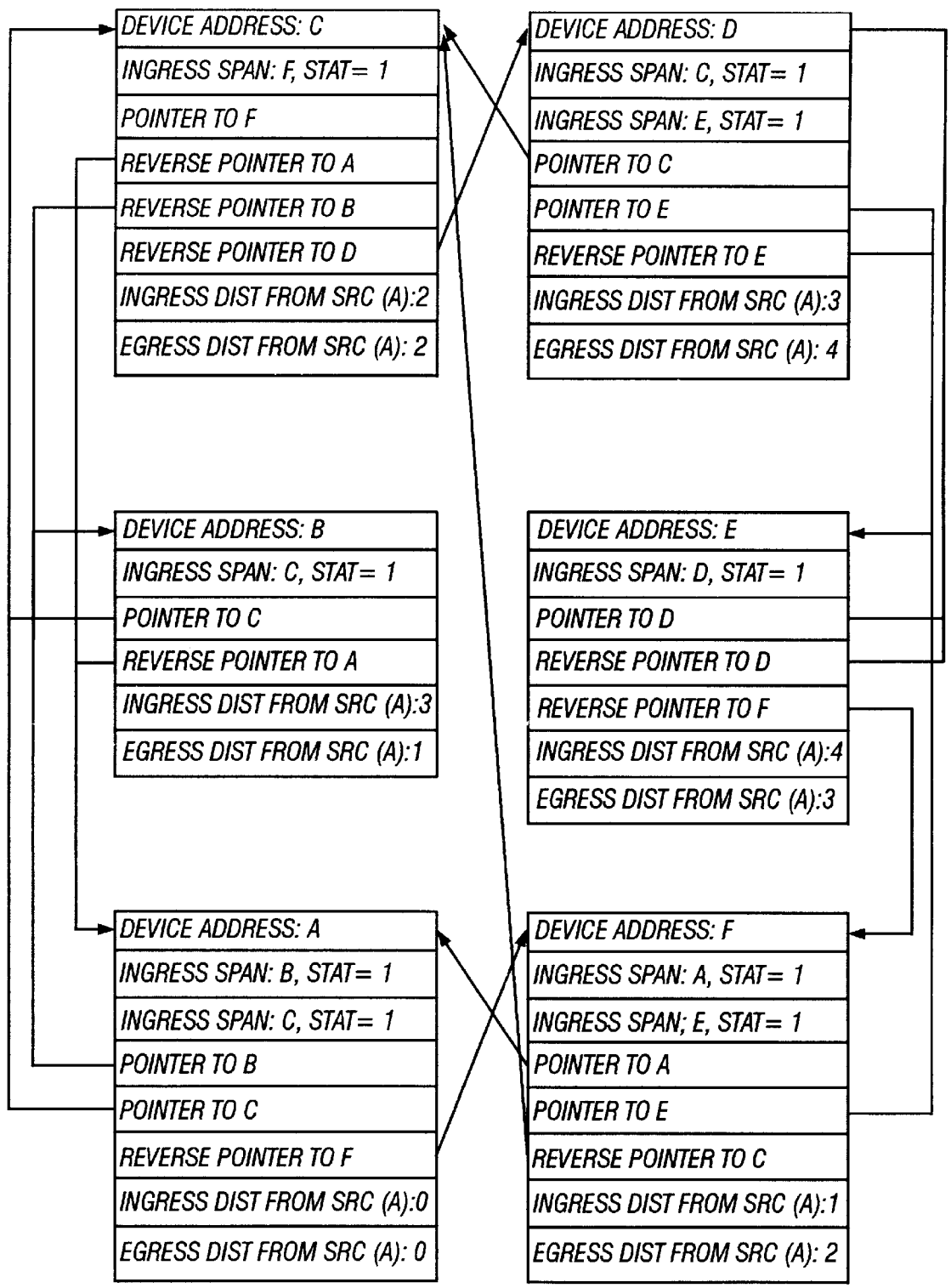
FIG. 8 is a software representation of the topology of FIG. 7.

An example of a network topology and its completed topology representation are shown in FIGS. 7 and 8, respectively. This representation is a general representation that can be used to map out a mesh topology. For a ring network, a simplified representation not necessarily requiring any pointers can be used to maximize processing speed.

The internal software representation is created starting with the element for the source device (A). Based on the ingress spans contained in the neighbor status message, elements for each ingress neighbor (B and C) of the source device (A) are created, along with creation of the pointers from the source to each neighbor. A similar process is followed for each ingress span of B and C, etc. until the entire network is mapped out. Upon mapping out the entire network, a reverse pointer is allocated to point in the reverse direction of each ingress pointer.

The topology representation is determined to be final for a session upon a topology discovery timeout measured from the time of original receipt of a message for that session. When the timeout occurs, a check of topology stability is performed. The topology stability time is quantified as the time period during which there has been no received message from other devices corresponding to the current session, e.g. no received neighbor status messages, and no internal notification of any link status change. If the topology stability time exceeds a configurable threshold, the topology is considered to have converged, and topology validation takes place. (The topology stability time threshold must of course be set large enough to ensure that topology discovery is not terminated prematurely under normal operating conditions.) Otherwise, the topology discovery timer may be reset, or if some maximum topology discovery time has been exceeded, topology discovery may be considered to have failed.

Topology validation ensures that: (a) No messages have been lost. This is guaranteed if a neighbor status message has been received from every node that is mentioned as a neighbor or as a source by any neighbor status message (with the current session ID) or neighbor information message received by a node; (b) No invalid or mismatched node addresses are included in the topology. This is easily determined by checking that each pair of adjacent nodes in the topology report each other as neighbors. In the event that a single fiber link connects adjacent nodes, the node on the receiving end of the fiber link must report a neighbor, and the node on the transmitting end of the fiber link (with an address equal to the neighbor address reported) must report an undefined neighbor address; (c) The topology is not invalid. No node in a valid topology with multiple nodes can report that it sees no neighbors. This indicates that a node is cannot receive any messages from any other node in the network. If topology validation passes, then the topology is determined to be valid. Upon finalization of the topology, distances (or more generally, weights or costs) corresponding to routes between nodes can be computed using standard routing algorithms such as Dijkstra's algorithm. The pointers and reverse pointers are laid out in such a way that processing speed for such algorithms is maximized. Again, for a ring network, simpler algorithms that further maximize processing speed can be used.

If dual-mode addressing is used, the long address of all nodes in the topology are sorted in increasing order and are then mapped in order to the corresponding short addresses (excluding any reserved short addresses, such as for broadcast). Once this mapping is complete, each device starts to use the new short addresses on data packets generated by that device. As stated earlier, this mapping is redone for each topology change for simplicity of implementation. It may be necessary, for reasons of minimizing loading on the control path from CPU 46 to packet processor 54, to remap short addresses only when necessary to resolve duplication. This requires a variety of additional functions running on CPU 46 to detect where duplication occurs and to determine which of a set of nodes with identical short addresses will modify their short addresses.

The above re-mapping technique is carried out in software or firmware using the hardware previously described. One skilled in the art is knowledgeable about programming the described hardware.

Figure 9:
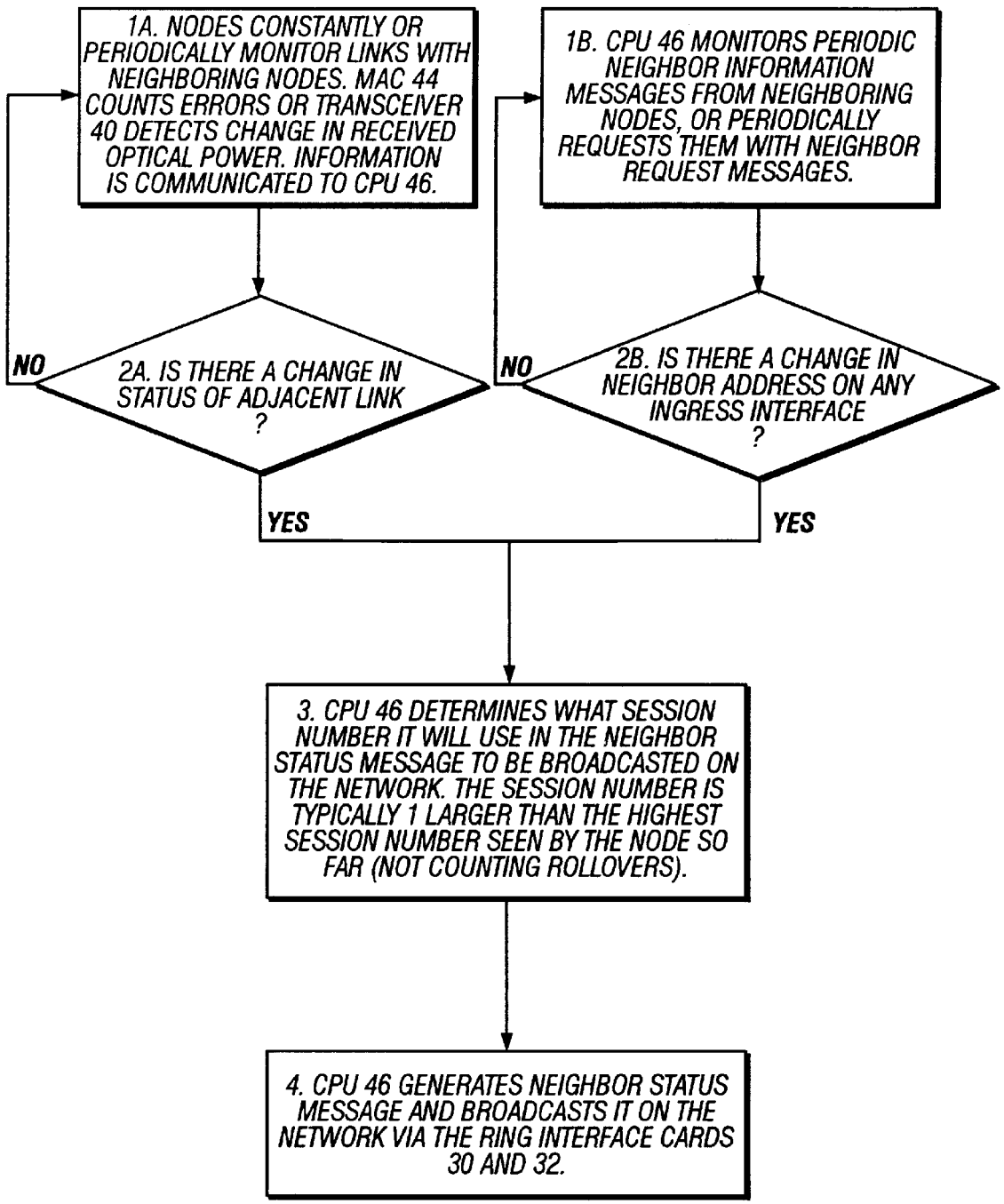
FIG. 9 is a flowchart illustrating the steps leading to the broadcast of a neighbor status message initiating topology discovery.

FIGS. 9–12 are flow charts summarizing the actions performed by software running on CPU 46 during the different stages of topology reconfiguration. FIG. 9 describes the scenarios that lead to an active device sending out a neighbor status message. CPU 46 may monitor ingress links from adjacent devices based on error counting by MAC 44 (previously described) or based on the detection of a loss of optical power on ingress fiber 36. This detection is performed by a variety of commercially available optical transceivers such as the Lucent NetLight transceiver family. The loss of optical power condition can be reported to CPU 46 via direct signaling over the backplane (such as via I2C lines), leading to an interrupt or low-level event at the CPU. CPU 46 stores the latest neighbor information on all ingress interfaces in memory, along with the latest session number. If any of the neighbor information and/or link status information changes, CPU 46 increments the session number and generates the neighbor status message for broadcast on the network.

Figure 10:
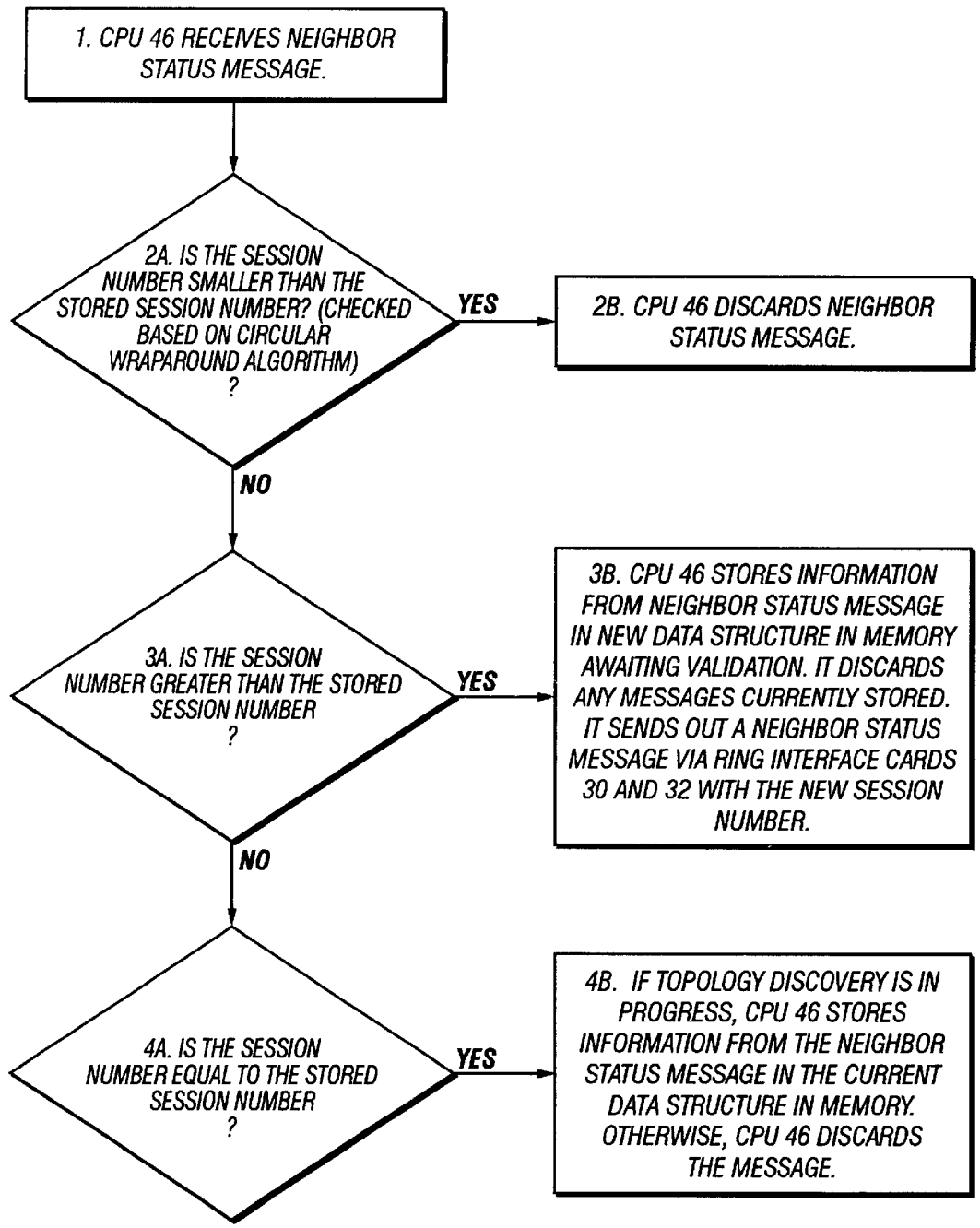
FIG. 10 is a flowchart illustrating the steps taken when a neighbor status message is received.

FIG. 10 describes the session number scenarios for a received neighbor status message. The information contained in FIG. 10 has been described previously. The essential point is that CPU 46 stores in memory all neighbor status message information on a device-by-device basis for the current session number. There are many well-known ways to perform this storage in memory, and those need not be described here. If the session number is updated, CPU 46 removes the information currently stored in memory and begins collection of information anew for the new session number. It is important to note that the implementation of mechanisms to prevent broadcast storms by managing state information at each device interface is best managed at packet processor 48, since it is not desirable to require the CPU to be involved in forwarding of broadcast messages.

Figure 11:
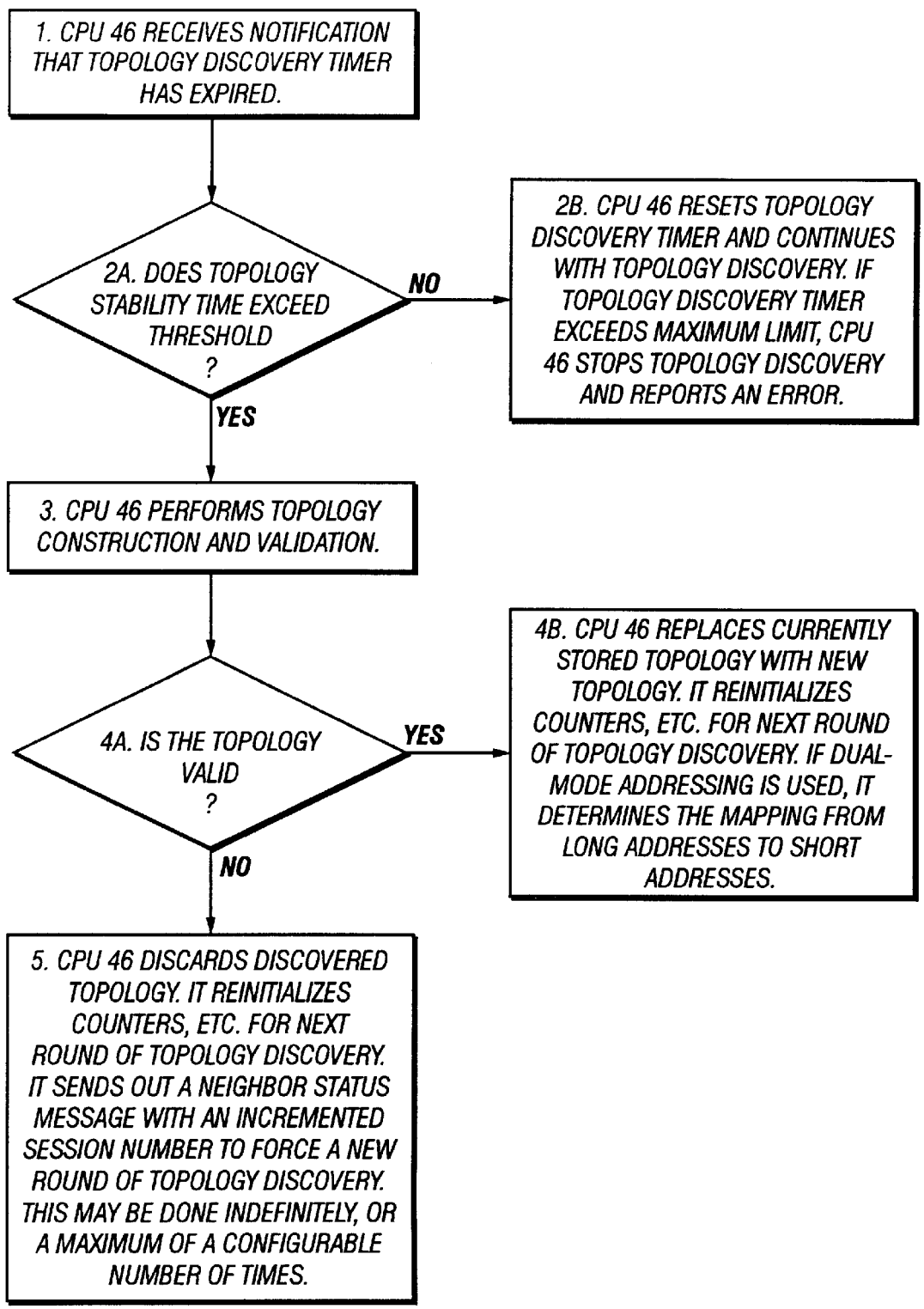
FIG. 11 is a flowchart illustrating the steps taken when the topology discovery timer expires.

FIG. 11 describes the actions performed within the CPU software when the timer for topology discovery has expired. The topology discovery timer is trivially implemented as a basic feature of real-time operating systems such as VxWorks by WindRiver Systems. When the topology discovery timer expires, the topology stability time is checked against a configurable threshold. This time is easily determined by keeping track of the time of the last received neighbor status message or internal notification of a link status change. Topology construction and validation is then performed. During this process, the valid topology currently stored in memory is not perturbed. If the topology is determined to be valid, then the valid topology is replaced. If the topology is determined to be invalid, a new round of topology discovery is started.

Figure 12A:
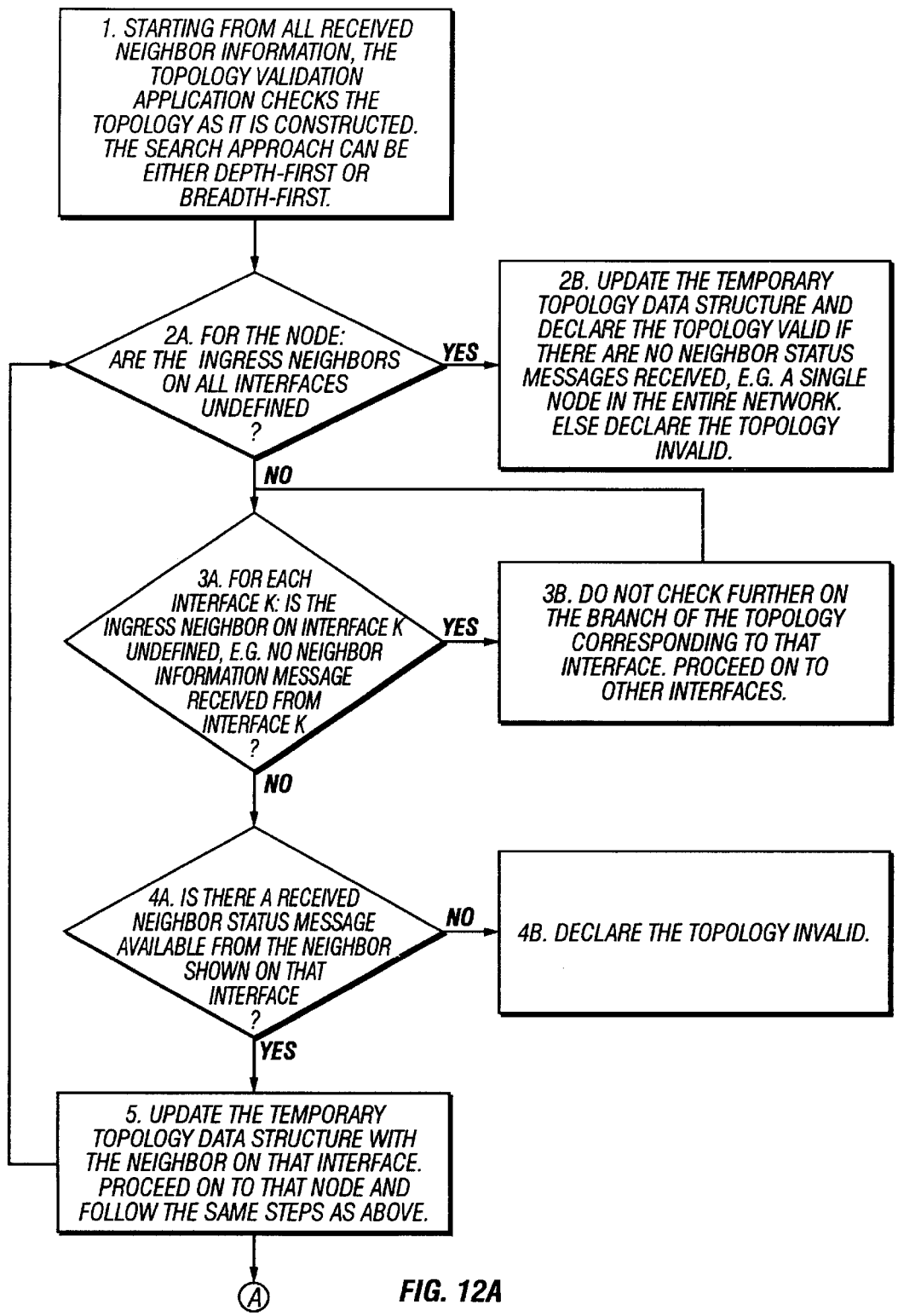
FIG. 12 is a flowchart illustrating the steps taken during topology validation.
Figure 12B:
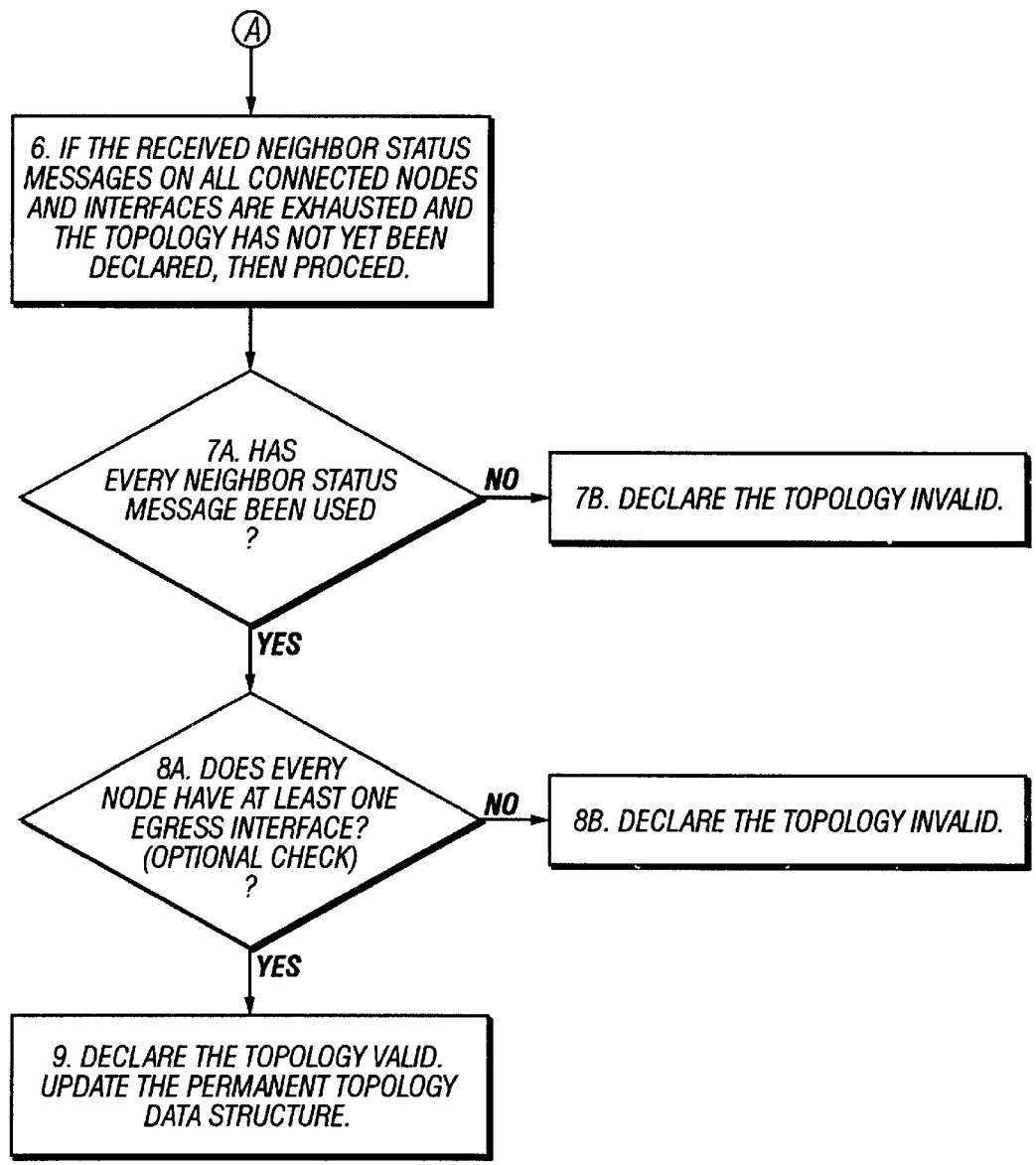

FIG. 12 describes in detail the steps in the topology validation software. The topology validation software running on a given device starts with the neighbors of that device on each ingress interface. It walks through the topology along ingress interfaces in either a depth-first or breadth-first manner until the full topology is constructed. As it constructs the topology, it checks for conditions that indicate an invalid topology. Step 2 indicates that a single node topology is considered valid, so long as no neighbors have been identified via received messages. However, a received neighbor status message that indicates that the source device has no neighbors signals an invalid topology. Step 3 indicates that whenever an interface is found where no neighbor is detected, this is an acceptable condition and simply indicates that no neighbor is connected. Step 4 indicates that if a neighbor device address is shown as being a neighbor of a device in a received neighbor status message, there must be a neighbor status message from that neighbor. If none has been received, that indicates that the message has been lost and that the topology is invalid. Step 5 indicates that the topology construction loops through all devices and all interfaces of each device to construct a data structure such as that shown in FIG. 8. Step 6 indicates that if the loops have completed and no invalid conditions have been found, then final checks can be performed. Step 7 indicates that if there are still unused neighbor status messages, e.g. device information stored in memory that is unlinked to any other device, then messages have been lost and the topology is invalid. Step 8 indicates that every node (device) must have at least one egress interface for the topology to be valid. This is an optional condition, depending on the network. If all of these checks are completed, then the topology is considered to be valid.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a communication network, said network comprising interconnected nodes, said method comprising:

generating an M-bit first destination address at a source node to designate a destination node for data to be transmitted on said network;

identifying at a first node within said network an N-bit second destination address for said destination node, N being significantly less than M;

transmitting within said network said data using said second destination address to route said data to said destination node, so as to reduce overhead in said network by transmitting fewer address bits;

detecting a certain event; and based on detecting said certain event, transmitting data to said destination node in said network using said first destination address, rather than using said second destination address.

2. The method of claim 1 wherein said certain event comprises detection of a topology change in said network.

3. A routing switch in a communications network, said network comprising interconnected routing switches, said routing switch having one or more processing elements configured to carry out the method comprising:

generating an M-bit first destination address to designate a destination node for data to be transmitted on said network;

identifying an N-bit second destination address for said destination node, N being significantly less than M;

transmitting within said network said data using said second destination address to route said data to said destination node, so as to reduce overhead in said network by transmitting fewer address bits;

wherein said processing elements are further configured to carry out the method comprising:

detecting a certain event; and based on detecting said certain event, transmitting data to said destination node in said network using said first destination address, rather than using said second destination address.

4. The routing switch of claim 3 wherein said certain event comprises detection of a topology change in said network.

\* \* \* \* \*